UNITED STATES PATENT OFFICE.

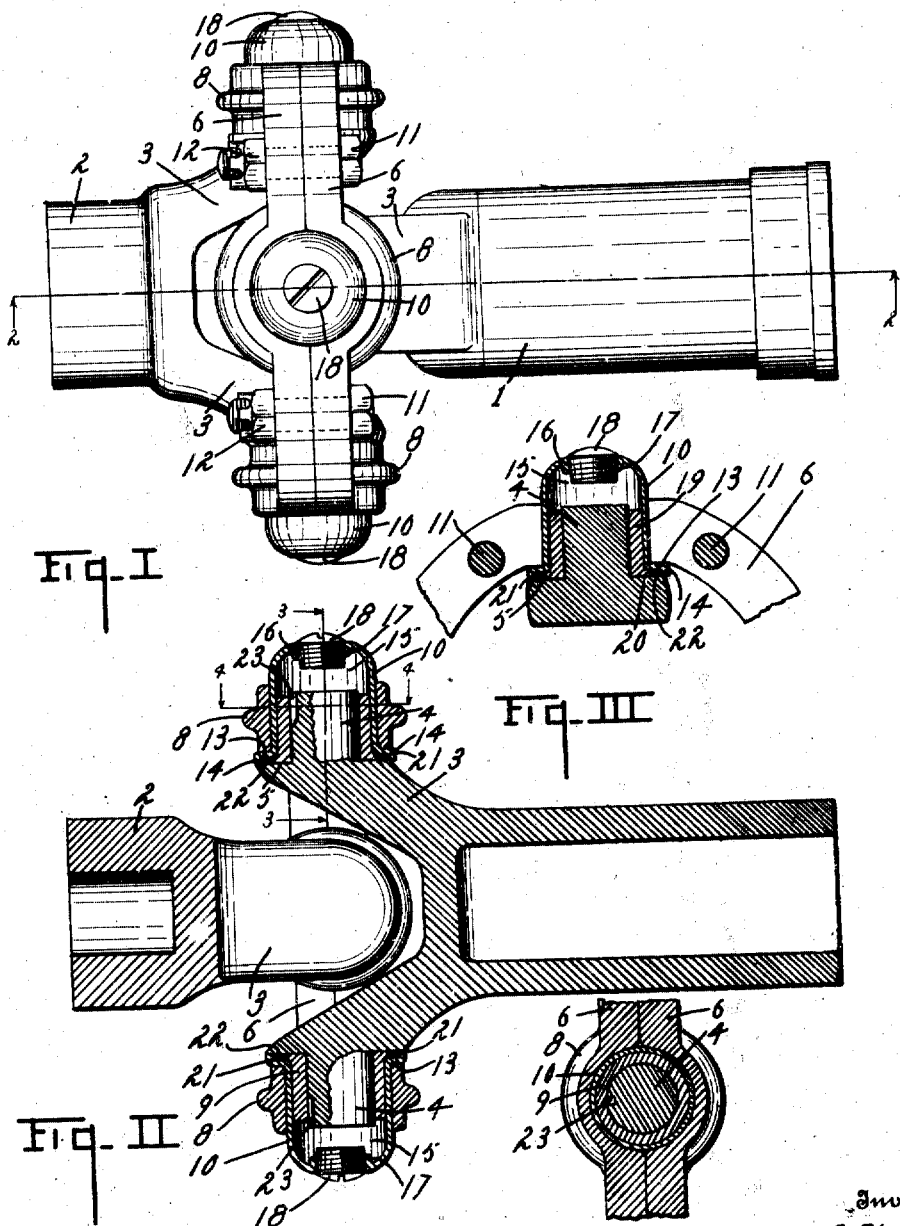

BERT O. RHODES, OF KALAMAZOO, MICHIGAN, ASSIGNOR TO ACME UNIVERSAL JOINT MFG. CO., OF KALAMAZOO, MICHIGAN.

UNIVERSAL JOINT.

1,278,218.   Specification of Letters Patent.   Patented Sept. 10, 1918.

Application filed October 13, 1917.   Serial No. 196,397.

*To all whom it may concern:*

Be it known that I, BERT O. RHODES, a citizen of the United States, residing at the city and county of Kalamazoo and State of Michigan, have invented certain new and useful Improvements in Universal Joints, of which the following is a specification.

This invention relates to improvements in universal joints.

The main objects of this invention are:

First, to provide an improved universal joint of a simple and durable structure.

Second, to provide an improved universal joint which has superior means for retaining lubricant and excluding dust from the bearings.

Third, to provide an improved universal joint which is simple and economical in structure and at the same time strong and durable.

Further objects, and objects relating to details and economies of construction and operation will definitely appear from the detailed description to follow.

I accomplish the objects of my invention by the devices and means described in the following specification. The invention is clearly defined and pointed out in the claims.

A structure constituting a preferred embodiment of my invention is illustrated in the accompanying drawing forming a part of this specification, in which:

Figure I is a side view of my improved joint.

Fig. II is a central longitudinal section on line corresponding to line 2—2 of Fig. I.

Fig. III is a detail section on a line corresponding to line 3—3 of Fig. II, showing details of one of the journals and its bearing.

Fig. IV is a transverse section through one of the journals and its bearing on a line corresponding to line 4—4 of Fig. II.

In the drawing similar reference characters refer to similar parts throughout the several views, and the sectional views are taken looking in the direction of the little arrows at the ends of the section lines.

Referring to the drawing, the same members 1 and 2 are adapted to receive the shaft sections to be joined. The sockets for the shaft sections are shown conventionally. The shaft members are provided with opposed arms 3 terminating in the journals 4 preferably formed integrally therewith. At the bases of the journals of the shaft members are provided shoulder-like bearing surfaces 5.

I provide an annular coupling-member, designated generally by the numeral 6, comprising two similar sections having opposed offsets 8 therein forming seats 9 for the bearing members 10, the coupling member sections being secured together by the bolts 11 provided with the castellated nuts 12.

The bearing members 10 are formed as stampings or drawn from sheet metal and have flanges 13 with inturned peripheries 14. These bearing members are clamped in the seats 9 of the coupling member, their diameter being such that when the nuts 12 of the clamping bolts 11 are turned up a clamping action is had upon the bearing members.

The bearing members project at their outer ends beyond the journals forming lubricant chambers or receptacles 15 having openings 16 therein for the introduction of the lubricant. These openings are formed by punching out the ends of the bearing members, the punch being arranged to carry in the flange 17 adapted to be threaded to receive the tapered closure plug 18. By tapering the plug a sealed joint is easily secured.

Bushings 19 having flanges 20 at their inner ends are pressed into the bearing members with their flanges engaging the inner ends thereof and their inner ends coacting with the bearing surfaces of the shaft members. In the event that the bushings do not fit the bearing members sufficiently tight so that they are properly held against rotation therein the bearing members, which, as stated, are formed from sheet metal, yield sufficiently to the clamping action of the coupling member so that the bushings are gripped thereby. It is intended, however, that the bushings shall be a close fit within the bearing members.

The peripheries of the bushing flanges are spaced from the inturned edges of the bearing member flanges providing annular gasket seats 21 in which the gaskets 22 are disposed to coact with the bearing surfaces of the journal members providing a substantially sealed joint at this point to retain the lubricant and exclude dust. The journals, when a sufficient amount of lubricant has worked down upon the same, become substantially air tight so that the air cannot enter into the lubricant chambers through this joint which would facilitate the escape of the lubricant.

The journals have longitudinal recesses 23 at their outer ends which facilitates the working of the lubricant down between the journals and the bushing.

The parts of my improved joint are simple and economical to produce and they are very readily assembled and disassembled as required. Should the bushings become worn they may be readily removed from the bearing members and new bushings inserted. New bearing members may be inserted complete without the aid of tools other than a wrench, which is a great advantage. It is found in practice that a small amount of lubricant is sufficient for perfect lubrication for a long period of time as it is not likely to escape from the lubricant chamber. At the same time it is held in such a position that the bearing surfaces are effectively lubricated.

My improved joint has the further advantage of being strong and durable even when made of comparatively light weight material and is also pleasing in appearance.

Having thus described my invention, what I claim as new and desire to secure by Letters Patent, is:

1. In a universal joint, the combination of shaft members provided with journals integral therewith and having shoulder-like thrust bearing surfaces at the bases of the journals, an annular coupling member formed of detachably connected sections having opposed recesses constituting bearing member seats, cup-like bearing members formed as stampings having flanges with inturned peripheries at their inner ends, the outer ends of said bearing members being extended beyond the journals and constituting lubricant receptacles and having lubricant openings therein, said bearing members being clamped in said coupling member seats with their flanges engaging the inner ends thereof and opposed to said bearing surfaces, bearing bushings having flanges at their inner ends pressed into said bearing members with their flanges engaging the inner ends thereof and their inner ends coacting with said bearing surfaces, said bushing flanges being spaced from the inturned edges of said bearing member flanges providing annular gasket seats, gaskets therein coacting with said bearing surfaces providing substantially sealed joints, and closure plugs sealing the lubricant openings of said bearing members, all coacting for the purpose specified.

2. In a universal joint, the combination of shaft members provided with journals integral therewith and having shoulder-like thrust bearing surfaces at the bases of the journals, an annular coupling member formed of detachably connected sections having opposed recesses constituting bearing member seats, cup-like bearing members formed as stampings having flanges with inturned peripheries at their inner ends, the outer ends of said bearing members being extended beyond the journals and constituting lubricant receptacles, said bearing members being clamped in said coupling member seats with their flanges engaging the inner ends thereof and opposed to said bearing surfaces, bearing bushings having flanges at their inner ends pressed into said bearing members with their flanges engaging the inner ends thereof and their inner ends coacting with said bearing surfaces, said bushing flanges being spaced from the inturned edges of said bearing member flanges providing annular gasket seats, and gaskets therein coacting with said bearing surfaces.

3. In a universal joint, the combination of shaft members provided with journals and having thrust bearing surfaces at the bases of the journals, a coupling member, cup-like bearing members having flanges with inturned peripheries at their inner ends, the outer ends of said bearing members being extended beyond the journals and constituting lubricant receptacles and having lubricant openings therein, said bearing members being secured in said coupling member seats with their flanges opposed to said bearing surfaces, bearing bushings having flanges at their inner ends disposed in bearing members with their flanges engaging the inner ends thereof and their inner ends coacting with said bearing surfaces, said bushing flanges being spaced from the inturned edges of said bearing member flanges providing annular gasket seats, gaskets therein coacting with said bearing surfaces providing substantially sealed joints, and closures sealing the lubricant openings of said bearing members, all coacting for the purpose specified.

4. In a universal joint, the combination of shaft members provided with journals and having thrust bearing surfaces at the bases of the journals, a coupling member, cup-like bearing members having flanges with inturned peripheries at their inner ends, the outer ends of said bearing members being extended beyond the journals and constituting lubricant receptacles, said bearing members being secured in said coupling member seats with their flanges opposed to said bearing surfaces, bearing bushings having flanges at their inner ends disposed in bearing members with their flanges engaging the inner ends thereof and their inner ends coacting with said bearing surfaces, said bushing flanges being spaced from the inturned edges of said bearing member flanges providing annular gasket seats, and gaskets therein coacting with said bearing surfaces.

5. In a universal joint, the combination of shaft members provided with journals and having thrust bearing surfaces at the bases of the journals, a coupling member, cup-like bearing members constituting substantially sealed lubricant receptacles with lubricant openings at their outer ends, and having flanges at their inner ends, said bearing members being secured in said coupling member with their flanges opposed to said bearing surfaces, gaskets disposed between said bearing member flanges and said bearing surfaces providing substantially sealed joints, and closures sealing the lubricant openings of said bearing members, all coacting for the purpose specified.

6. In a universal joint, the combination of shaft members provided with journals and having thrust bearing surfaces at the bases of the journals, a coupling member, bearing members constituting substantially sealed lubricant receptacles mounted on said coupling member with their inner ends opposed to said bearing surfaces, and gaskets disposed between said bearing members and said bearing surfaces providing substantially sealed joints, all coacting for the purpose specified.

In witness whereof, I have hereunto set my hand and seal in the presence of two witnesses.

BERT O. RHODES. [L. S.]

Witnesses:
LUELLA G. GREENFIELD,
MARGARET L. GLASGOW.